US012542606B2

(12) United States Patent
Paul et al.

(10) Patent No.: US 12,542,606 B2
(45) Date of Patent: Feb. 3, 2026

(54) RANDOMIZATION BASED REDUNDANT COLLECTION TASK SCHEDULING FOR MITIGATING OCCLUSIONS IN SENSING BY SMALL SATELLITE CONSTELLATIONS

(71) Applicant: Tata Consultancy Services Limited, Mumbai (IN)

(72) Inventors: Himadri Shekhar Paul, Kolkata (IN); Swagata Biswas, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 336 days.

(21) Appl. No.: 18/480,086

(22) Filed: Oct. 3, 2023

(65) Prior Publication Data

US 2024/0129028 A1 Apr. 18, 2024

(30) Foreign Application Priority Data

Oct. 7, 2022 (IN) .............................. 202221057586

(51) Int. Cl.
 *H04B 7/185* (2006.01)
(52) U.S. Cl.
 CPC ..... *H04B 7/18534* (2013.01); *H04B 7/18573* (2013.01)
(58) Field of Classification Search
 CPC ............ H04B 7/18513; H04B 7/18534; H04B 7/18567; H04B 7/18573; H04B 7/185
 USPC ................ 348/143, 144; 718/102, 100, 103; 370/252; 455/12.1; 707/748, 736
 See application file for complete search history.

(56) References Cited

U.S. PATENT DOCUMENTS

2014/0040282 A1* 2/2014 Mann ................... B64G 1/1021
 707/736
2018/0034536 A1* 2/2018 Trutna ............... H04B 7/18521

OTHER PUBLICATIONS

Nag, Sreeja et al., "Autonomous Scheduling of Agile Spacecraft Constellations with Delay Tolerant Networking for Reactive Imaging", Title of the item: International Conference on Automated Planning and Scheduling SPARK Workshop, Date: 2019, Link: https://openreview.net/pdf?id=rJeDNZq5FE.

(Continued)

*Primary Examiner* — Sherrie Hsia
(74) *Attorney, Agent, or Firm* — Finnegan, Henderson, Farabow, Garrett & Dunner, LLP

(57) ABSTRACT

The present disclosure addresses unresolved problems of task scheduling by adding redundancy in a collection task schedule generated by a ground control station. Embodiments of the present disclosure provide a randomization based redundant collection task scheduling for mitigating occlusions in sensing by small satellite constellations. The randomization based redundant collection task scheduling algorithm receives as input a set of region of observations tessellated into sub-regions, and then collection opportunities for each sub-region is computed based on satellite tracks data. Further, a sub-set of collection opportunities is determined from all the possible collection tasks for each sub-region to further generate the collection task schedule for each of the region of observation. Number of collections opportunities is controlled by a decay function which holds number of redundant collections to a bound, thereby increasing chance of good collection without investing too much resource in redundancy to mitigate occlusions.

15 Claims, 8 Drawing Sheets

(56) References Cited

OTHER PUBLICATIONS

Huang, Yixin et al., "Revising the Observation Satellite Scheduling Problem Based on Deep Reinforcement Learning", Title of the item: Remote Sensing, Date: 2021, Publisher: MDPI, Link: https://openreview.net/pdf?id=rJeDNZq5FE.

* cited by examiner

```
┌─────────────────────────────────────────────────────────────┐
│ Receiving, a request from a user, wherein the request is    │
│ associated with generating a collection task schedule for   │──▶ 202
│ a set of small satellites grouped as a satellite            │
│ constellation for a set of regions of observations, and     │
│ wherein the request comprises a scheduling horizon          │
│ indicative of a time duration for which the collection      │
│ task schedule is generated                                  │
└─────────────────────────────────────────────────────────────┘
                              ▼
┌─────────────────────────────────────────────────────────────┐
│ Tessellating, each region of observation from the plurality │──▶ 204
│ of region of observations into a plurality of sub-regions   │
│ based on a sensing capability of the satellite constellation│
└─────────────────────────────────────────────────────────────┘
                              ▼
┌─────────────────────────────────────────────────────────────┐
│ Generating, a plurality of track data for the satellite     │
│ constellation for a predefined interval range of the        │──▶ 206
│ scheduling horizon, wherein the plurality of track data     │
│ represents position of a corresponding satellite from the   │
│ satellite constellation over earth for a period of the      │
│ predefined interval range of the scheduling horizon         │
└─────────────────────────────────────────────────────────────┘
                              ▼
┌─────────────────────────────────────────────────────────────┐
│ Computing, a set of collection opportunities by each        │──▶ 208
│ satellite in the satellite constellation for each sub-region│
│ from the plurality of sub-regions based on the plurality of │
│ track data for the satellite constellation                  │
└─────────────────────────────────────────────────────────────┘
                              ▼
┌─────────────────────────────────────────────────────────────┐
│ Generating, the collection task schedule for each satellite │
│ in the satellite constellation for each region from the     │
│ plurality of regions using a randomized selection based     │
│ algorithm, wherein the randomized selection based algorithm │
│ comprises: creating a Boolean array of a predefined size    │
│ with each element of the Boolean array initialized as       │
│ false; iteratively performing for the predefined size of    │
│ the Boolean array, steps of: randomly selecting an element  │
│ of the Boolean array; generating, a random number within a  │──▶ 210
│ predefined range; setting value of the randomly selected    │
│ element of the Boolean array to true when the generated     │
│ random number is more than a threshold; and creating, by    │
│ including the randomly selected element of the Boolean      │
│ array set as true, a subset of collection opportunities     │
│ from the set of collection opportunities by each satellite  │
│ in the satellite constellation for each sub-region; and     │
│ generating, the collection task schedule for each satellite │
│ in the satellite constellation for each sub-region from the │
│ plurality of sub-regions, using the subset of collection    │
│ opportunities                                               │
└─────────────────────────────────────────────────────────────┘
```

200 ⤴      FIG. 2

RANDOMIZATION BASED REDUNDANT COLLECTION TASK SCHEDULING FOR MITIGATING OCCLUSIONS IN SENSING BY SMALL SATELLITE CONSTELLATIONS

PRIORITY CLAIM

This U.S. patent application claims priority under 35 U.S.C. § 119 to: India Application No. 202221057586, filed on Oct. 7, 2022. The entire contents of the aforementioned application are incorporated herein by reference.

TECHNICAL FIELD

The disclosure herein generally relates to the field of collection task scheduling, and, more particularly, to randomization based redundant collection task scheduling for mitigating occlusions in sensing by small satellite constellations.

BACKGROUND

Small satellite clustered systems are getting increasingly affordable as a sensing infrastructure for earth observation. New urban sensing applications are being conceived and capability of existing ones gets augmented by such systems. A small satellites constellation flying in low earth orbit (LEO) offers high fidelity spatial and temporal data which has applications in various urban management tasks, like detecting and monitoring constructions, green cover, traffic management, and/or the like. A region can potentially be imaged by multiple satellites, based their tracks. Given a set of such regions, a ground control assigns and schedules collection tasks to the satellites in the constellation. Given multiple constraints related to kinematics of the satellites, windows of observations and communication to the ground station, the problem of task assignment is known to be computationally hard.

While a few conventional optimization techniques provide solutions for the problem of task assignment, these optimization techniques do not take into account environmental disturbances which may occlude sensor view and render collected data useless for processing. Although, tolerance to such external disturbances can be mitigated through redundancy in collection schedule, but at a cost of penalty of generating and transferring larger data volume to ground stations.

SUMMARY

Embodiments of the present disclosure present technological improvements as solutions to one or more of the above-mentioned technical problems recognized by the inventors in conventional systems. For example, in one embodiment, a processor implemented method is provided. The method comprising receiving, via one or more hardware processors, a request from a user, wherein the request is associated with generating a collection task schedule for a set of small satellites grouped as a satellite constellation for a set of regions of observations, and wherein the request comprises a scheduling horizon indicative of a time duration for which the collection task schedule is generated; tessellating, via the one or more hardware processors, each region of observation from the plurality of region of observations into a plurality of sub-regions based on a sensing capability of the satellite constellation; generating, via the one or more hardware processors, a plurality of track data for the satellite constellation for a predefined interval range of the scheduling horizon, wherein the plurality of track data represents position of a corresponding satellite from the satellite constellation over earth for a period of the predefined interval range of the scheduling horizon; computing, via the one or more hardware processors, a set of collection opportunities by each satellite in the satellite constellation for each sub-region from the plurality of sub-regions based on the plurality of track data for the satellite constellation; and generating, via the one or more hardware processors, the collection task schedule for each satellite in the satellite constellation for each region from the plurality of regions using a randomized selection based algorithm, wherein the randomized selection based algorithm comprises: creating a Boolean array of a predefined size with each element of the Boolean array initialized as false; iteratively performing for the predefined size of the Boolean array, steps of: randomly selecting an element of the Boolean array; generating, a random number within a predefined range; setting value of the randomly selected element of the Boolean array to true when the generated random number is more than a threshold; and creating, by including the randomly selected element of the Boolean array set as true, a subset of collection opportunities from the set of collection opportunities by each satellite in the satellite constellation for each sub-region; and generating, the collection task schedule for each satellite in the satellite constellation for each sub-region from the plurality of sub-regions, using the subset of collection opportunities.

In another embodiment, a system is provided. The system comprising a memory storing instructions; one or more communication interfaces; and one or more hardware processors coupled to the memory via the one or more communication interfaces, wherein the one or more hardware processors are configured by the instructions to receive, a request from a user, wherein the request is associated with generating a collection task schedule for a set of small satellites grouped as a satellite constellation for a set of regions of observations, and wherein the request comprises a scheduling horizon indicative of a time duration for which the collection task schedule is generated; tessellate, each region of observation from the plurality of region of observations into a plurality of sub-regions based on a sensing capability of the satellite constellation; generate, a plurality of track data for the satellite constellation for a predefined interval range of the scheduling horizon, wherein the plurality of track data represents position of a corresponding satellite from the satellite constellation over earth for a period of the predefined interval range of the scheduling horizon; compute, a set of collection opportunities by each satellite in the satellite constellation for each sub-region from the plurality of sub-regions based on the plurality of track data for the satellite constellation; and generate, the collection task schedule for each satellite in the satellite constellation for each region from the plurality of regions using a randomized selection based algorithm, wherein the randomized selection based algorithm comprises: creating a Boolean array of a predefined size with each element of the Boolean array initialized as false; iteratively performing for the predefined size of the Boolean array, steps of: randomly selecting an element of the Boolean array; generating, a random number within a predefined range; setting value of the randomly selected element of the Boolean array to true when the generated random number is more than a threshold; and creating, by including the randomly selected element of the Boolean array set as true, a subset of collection opportunities from the set of collection opportunities by each satellite in the satellite constellation for each sub-region; and generating, the collection task schedule for each satellite in the satellite constellation for each sub-region from the plurality of sub-regions, using the subset of collection opportunities.

In yet another embodiment, a non-transitory computer readable medium is provided. The non-transitory computer readable medium comprising receiving, a request from a user, wherein the request is associated with generating a collection task schedule for a set of small satellites grouped as a satellite constellation for a set of regions of observations, and wherein the request comprises a scheduling horizon indicative of a time duration for which the collection task schedule is generated; tessellating, each region of observation from the plurality of region of observations into a plurality of sub-regions based on a sensing capability of the satellite constellation; generating, a plurality of track data for the satellite constellation for a predefined interval range of the scheduling horizon, wherein the plurality of track data represents position of a corresponding satellite from the satellite constellation over earth for a period of the predefined interval range of the scheduling horizon; computing, a set of collection opportunities by each satellite in the satellite constellation for each sub-region from the plurality of sub-regions based on the plurality of track data for the satellite constellation; and generating, the collection task schedule for each satellite in the satellite constellation for each region from the plurality of regions using a randomized selection based algorithm, wherein the randomized selection based algorithm comprises: creating a Boolean array of a predefined size with each element of the Boolean array initialized as false; iteratively performing for the predefined size of the Boolean array, steps of: randomly selecting an element of the Boolean array; generating, a random number within a predefined range; setting value of the randomly selected element of the Boolean array to true when the generated random number is more than a threshold; and creating, by including the randomly selected element of the Boolean array set as true, a subset of collection opportunities from the set of collection opportunities by each satellite in the satellite constellation for each sub-region; and generating, the collection task schedule for each satellite in the satellite constellation for each sub-region from the plurality of sub-regions, using the subset of collection opportunities.

In accordance with an embodiment of the present disclosure, the generated collection task schedule for each satellite in the satellite constellation for each region from the plurality of regions is used for mitigating occlusions.

In accordance with an embodiment of the present disclosure, the set of collection opportunities is redundant, where each redundant collection opportunity represents a probability of successful collection by each satellite in the satellite constellation for each sub-region from the plurality of sub-regions.

In accordance with an embodiment of the present disclosure, the predefined size of the Boolean array is equal to number of collection opportunities in the computed set of collection opportunities.

In accordance with an embodiment of the present disclosure, the threshold is controlled by a decay function to control the number of collection opportunities to be selected from the set of collection opportunities.

In accordance with an embodiment of the present disclosure, the threshold is dynamically updated.

In accordance with an embodiment of the present disclosure, the decay function is an exponential decay function with decay rate A.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 illustrates an exemplary flow diagram illustrating a method for randomization based redundant collection task scheduling for mitigating occlusions in sensing by small satellite constellations in accordance with some embodiments of the present disclosure.

DETAILED DESCRIPTION

Figure 1:
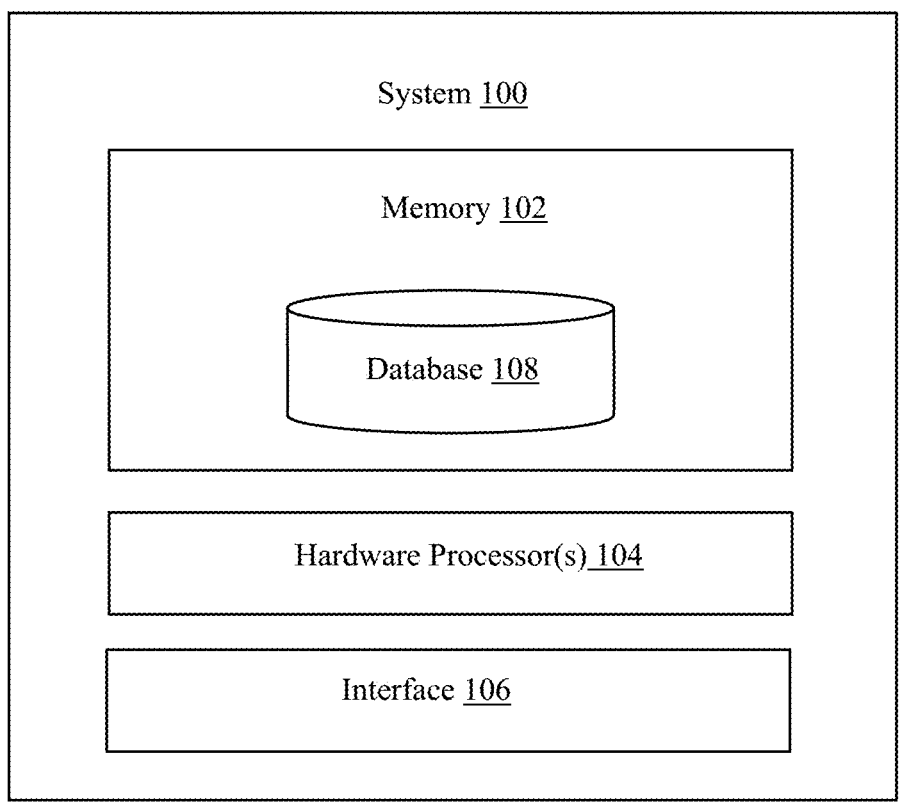
FIG. 1 illustrates an exemplary system for randomization based redundant collection task scheduling for mitigating occlusions in sensing by small satellite constellations according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Technological advantages coupled with their commercial viability has shifted focus of earth observation (EO) infrastructure towards small satellite clustered systems. Small satellites revolve in low earth orbits (LEO) and have a capability to gather high resolution observation data which commensurate with current environmental and social-economical demands in urban-life. The small satellites orbiting in LEO can observe a region closely and by virtue of their high re-visit frequency, observation data for that region can be updated as frequently. Such capability can augment many urban sensing applications, such as fire detection in high rises, traffic management, monitoring construction projects, and/or the like.

Given a set of regions for observation, ground control system can instrument appropriate mission for a constellation. Scheduling observations for the satellites is basic operation of ground control. Scheduling is a complex problem involving constraints like type of the sensing system, resolution, angle of view on region of interest (RoI), and/or like. Typically, a single RoI cannot be observed a single satellite, orbiting in LEO, due to its constraint in viewing angle. A region is first tessellated into smaller sub-regions and a scheduler assigns observation of a sub-region as a collection task to an appropriate satellite. Under constraints like minimization of communication overhead, maximization of observation extent, and/or the like, task assignment (alternatively referred a task scheduling) leads to an optimization problem and is known to be computationally hard. Sensor occlusions due to external disturbances (e.g., cloud cover), renders collected data to be useless. If the collection tasks for sufficient number of tessellated sub-regions generate useless data, analysis of whole RoI may fail. Considering external disturbances have temporal variations, multiple but redundant collection tasks, corresponding to observation of a sub-region, scheduled at various time instances can improve chances of successful observation for the whole RoI.

The task scheduling problem for satellite constellation involves selecting data collection opportunities that maximizes observation objectives while simultaneously obeying system constraints. Basic inputs to this problem are a set of RoIs obtained from users of the system, trajectories of the satellites, and a planning horizon. Conventionally, the problem is implemented in context of a single, agile satellite and more recently for multi-satellite systems. One existing work presents a Lagrangian relaxation of integer programming problem to solve scheduling for COSMO-Skymed, a three satellite SAR constellation, results of which are further improved to cater for a larger system and higher planning horizon. Another state of the arts describes a mixed approach of dynamic programming with MILP to solve the multi-objective scheduling problem in reasonable time and this also shows significant improvement in quality of solution over their earlier graph based approach. Further, classification of scheduling algorithms in two broad categories, namely feasibility and in-feasibility based interpretations is also discussed in conventional approaches which propose a maximum independent set based heuristic and show the approaches scales well for large constellations. Further, fault tolerance has been extensively studied, specifically in the context of space exploration. However, there is little research work available in subject of fault tolerance in the context of satellite constellation.

While an on-line scheduling algorithm that incorporates redundancy to mitigate failure is disclosed in a known in the art approach, it is in the context of fault tolerant on-board computing of a standalone CubeSat. In a similar approach, an on-board fault tolerant computing architecture for nano-satellites using COTS is discussed. A convolution neural networks (CNN) based on-board image processing instrument is also used to analyze captured images for detecting cloud cover before sending out the data to ground station. Though, this proposal reduces transmission of useless data to ground station, but at a cost of additional processing capacity and power budget for on-board processing. Further, such technology is not yet mature enough to be adopted for small satellites, which are constrained by both form factor and power harvesting capability. A scheduling problem for earth observation under uncertainties like cloud cover for a satellite constellation observing a swath on earth surface is discussed in another known in the art approach, where a formulation based on a budgeted uncertainty set is used, while preserving the formulation linearity.

The present disclosure addresses unresolved problems of the task scheduling by adding redundancy in a collection task schedule generated by the ground control. The present disclosure employs probabilistic measures as a balancing technique to reduce redundant collections, while increasing probability of successful collections. Embodiments of the present disclosure provide randomization based redundant collection task scheduling for mitigating occlusions in sensing by small satellite constellations. In the present disclosure, collection regions are assumed to be discrete and a redundancy based collection scheduling algorithm is presented. It is assumed that optical sensors installed on satellites and cloud cover can occlude images captured by the sensors. The method of the present disclosure considers a set of tessellated sub-regions R scheduled for observation within a constellation of k satellites, with redundancy to mitigate occlusions including occlusions due to cloud cover. The method of the present disclosure is a generic method with a strategy $G(\alpha)$, which tries to maximize successful collection for $\alpha$-fraction of the set of tessellated sub-regions corresponding to a region. The present disclosure comprises a ground station which incorporate the randomization based redundant collection task scheduling algorithm (Alternatively referred as redundancy based collection task scheduling algorithm) to generate a schedule to define mission of the satellites.

The randomization based redundant collection task scheduling algorithm of the present disclosure receives as input a set of region of interests (RoIs), tessellated into sub-regions, and then collection opportunities for each sub-region is computed based on satellite tracks and their kinematics following state-of-the-art procedures. A final schedule for each of the region of interest is constructed which are then combined to be presented as a single schedule. The method of the present disclosure determines a sub-set of collection tasks from all the possible collection tasks for each sub-region. The number of collections is controlled by a decay function which holds number of redundant collections to a bound even though there may be very large number of collection opportunities present for a sub-region, thereby increasing chance of good collection without investing too much resource in redundancy to mitigate occlusions.

In the context of present disclosure, the expressions 'region of interest' and 'region of observation' may be interchangeably used. Similarly, the expressions 'collection task schedule', 'task schedule, 'collection schedule', 'and 'schedule' may also be interchangeably used. Further, the expressions 'collection opportunity', 'opportunity, 'collection task' 'and 'collection' may also be interchangeably used.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates an exemplary system for randomization based redundant collection task scheduling for mitigating occlusions in sensing by small satellite constellations according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W 5 and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, a system database 108 is comprised in the memory 102, wherein the system database 108 comprises information pertaining to a set of satellites, track data of the set of satellites, a set of collection opportunities, and a collection schedule of the set of satellites for a set of region of observations. Although the system database 108 is shown internal to the system 100, it will be noted that, in alternate embodiments, the system database 108 can also be implemented external to the system 100, where the system database 108 may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the system database 108 may be distributed between the system 100 and the external database.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary flow diagram illustrating a method 200 for randomization based redundant collection task scheduling for mitigating occlusions in sensing by small satellite constellations, using the system 100 of FIG. 1, in accordance with an embodiment of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the flow diagram as depicted in FIG. 2, and one or more illustrative examples. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

In an embodiment, at step 202 of the present disclosure, the one or more hardware processors 104 are configured to receive, a request from a user. The request is associated with generating a collection task schedule for a set of small satellites grouped as a satellite constellation for a set of regions of observations. The request comprises a scheduling horizon denoted by H which is indicative of a time duration for which the collection task schedule is generated. In an embodiment, the user could be a person, an external device, and/or the like using an application implemented using the method or system of the present disclosure. For example, a set of region of observations denoted by $R_j=\{R_1, R_2, \ldots R_n\}$ is considered for which observation data has to be collected. Similarly, a set of k small satellites grouped as a satellite constellation are received and denoted by $S=\{S_1, S_2, \ldots S_k\}$.

In an embodiment, at step 204 of the present disclosure, the one or more hardware processors 104 are configured to tessellate to each region of observation from the plurality of region of observations into a plurality of sub-regions based on a sensing capability of the satellite constellation. For a large enough region of observation, whole region cannot be observed by a single satellite. A usual method is to tessellate each region of observation into smaller sub-regions, such that each of the sub-regions can be served by a single satellite. Thus, each region of observation R from the set of regions of observations $R_j$ is tessellated into the plurality of sub-regions (also referred as observation sub-tasks) denoted as $R=\{r_1, r_2, \ldots r_n\}$. Given the satellite constellation of k small satellites, $S=\{S_1, S_2, \ldots S_k\}$, the objective is to collect observation data for these sub-regions using the satellite constellation.

In an embodiment, at step 206 of the present disclosure, the one or more hardware processors 104 are configured to generate a plurality of track data for the satellite constellation for a predefined interval range of the scheduling horizon. The predefined interval range of the scheduling horizon is [0, H]. The plurality of track data represents position (e.g., latitude, longitude) of a corresponding satellite from the satellite constellation over earth for a period of the predefined interval range of the scheduling horizon. The plurality of track data for the satellite constellation is generated by a state in the art SkyField library method. Based on the plurality of track data for the satellite constellation, a sub-region can be observed by multiple satellite.

In an embodiment, at step 206 of the present disclosure, the one or more hardware processors 104 are configured to compute a set of collection opportunities by each satellite in the satellite constellation for each sub-region from the plurality of sub-regions based on the plurality of track data for the satellite constellation. In an embodiment, the collection opportunity for a satellite is computed when the satellite is over a correspond sub-region, as determined from the plurality of track data for the satellite. So, one instance of the collection opportunity is defined in terms of a satellite and a time at which it is over a corresponding sub-region. In an embodiment, the set of collection opportunities is redundant, where each redundant collection opportunity represents a probability of successful collection by each satellite in the satellite constellation for each sub-region from the plurality of sub-regions. Further, at step 208 of the present disclosure, the one or more hardware processors 104 are configured to generate the collection task schedule for each satellite in the satellite constellation for each region from the plurality of regions using a randomized selection based algorithm. In an embodiment, the plurality of sub-regions are ordered based on a number of the collection opportunities for each sub-region from the plurality of sub-regions in a descending order. Further, an α-fraction of the plurality of sub-regions corresponding to a region of observation which has higher number of collection opportunities in comparison to the other sub-regions is selected. The randomized selection based algorithm is performed on each set of collection opportunities by each satellite in the satellite constellation for each sub-region from α-fraction of the plurality of sub-regions. The randomized selection based algorithm comprises first creating a Boolean array of a predefined size with each element of the array initialized as false. The Boolean array is represented by b and the predefined size of the Boolean array is denoted by d. The predefined size of the Boolean array is equal to number of collection opportunities in the computed set of collection opportunities. Further, for the predefined size d of the Boolean array b, following steps are iteratively performed: first an element of the Boolean array b is randomly selected Further, a random number s is generated within a predefined range, where the predefined range is 0.0 to 1.0. Value of the randomly selected element of the Boolean array is set to true when the generated random number is more than a threshold p. This means if (s<p), then a unique position is selected randomly in the Boolean array b and set to true. This is done with two-fold objective. First, to ensure that at least one collection opportunity for a region is included, and second if the list is large, more number of opportunities are rejected. The threshold is controlled by a decay function to control the number of collection opportunities to be selected from the set of collection opportunities. The decay function is an exponential decay function with decay rate A and is provided as $p=e^{-t\lambda}$. The threshold is dynamically updated and gradually reduces as the d iterations progress. At the end of d iterations, the randomly selected elements of the Boolean array set as true, are used to create a subset of collection opportunities from the set of collection opportunities by each satellite in the satellite constellation for each sub-region. Further, a collection task schedule for each satellite in the satellite constellation for each sub-regions from the plurality of sub-regions is generated using the subset of collection opportunities.

The entire method of the present disclosure using randomization based redundant collection task scheduling algorithm can be further better understood by way of following pseudo code provided as example:

```
Input: S = {S₁,S₂,...S_k} : Set of small satellites in a satellite constellation
Input: R: Regions of Interest or Region of observation
Input: H: Scheduling horizon
Input: λ: Decay function parameter
Output: X: A collection task schedule for the satellite constellation
begin
1     Generate satellite track data for interval [0,H ]
      X' ← Ø;
2     for R_j ∈ R do
3       Tessellation of R_j into R = {r₁,r₂,...r_n} based on the sensing capability of
        the constellation.
4       Computation of collection opportunities by satellites for each-regions based
        on the tracks of the satellites. For the sub-region r_i ∈ R, P_i =
        {< S_j,tm >} denotes the set of collection opportunities as a tuple, denoting
        the satellite (S_j) to collect and the time tm of the collection opportunity.
        Let, P = {P₁,P₂,...P_n}
5       Create a sorted list with elements of P as
        Q = [P_{a₁},P_{a₂},...P_{a_n}] : P_{a_i} ∈ P, |P_{a_i}| ≤ |P_{a_{i+1}}|
        m ← nα; i ← 1;
6       while i ≤ m do
          S ← randReduce(P_{a_i},λ)
          X' = X' ∪ S
          i ← i + 1
7       while i ≤ n do X' = X' ∪ s : s ∈ P_{a_i}; i ← i + 1;
8     X ← sort X' in ascending order on timestamp (tm)
```

The randomization based redundant collection task scheduling algorithm illustrated using the above pseudocode follows a generic flow. As shown in the above pseudocode, the method takes as input a set of RoIs, tessellated into sub-regions, and then collection opportunities for each sub-region are computed based on satellite tracks and their kinematics following state-of-the-art procedures. The final schedule for each of the region is constructed in lines 6-7 which are then combined to present as a single schedule X as shown in line 8 of the above pseudocode. The randReduce mentioned in the above pseudocode represents the randomized selection based algorithm which represents random choice of opportunities to reduce overall collection count.

The entire process of randomized selection based algorithm can be further better understood by way of following pseudo code provided as example:

```
Input: P_i = {< S_j,t >} : Set of collection opportunities
Input: λ: Decay rate for decay function
Output: X_i = {< S_j,tm >: S_j ∈ S,tm ∈ [0,H ] }: A list of collection opportunities
Function randReduce(P_i, λ):
                d ← |P_i|;                    // Cardinality of P_i
                b[1:d] ← [false];             // d length Boolean vector initialized to false
1               t ← 0
2               while t < d do
                    // Decay function for probability of acceptance
3                   p ← e^{-tλ}
4                   toss ← random value in [0.0, 1.0]
5                   if toss ≤ p then
                            b[i] ← true
                        i = random value in integer interval [d, 1]
                        while b[i] = true do i ← i + 1
6                   t ← t + 1
7               X_i ← ∅ k ← 1;
8               for ∀s ∈ P_i do
                    if b[k] = true then X_i ← X_i ∪ {s};
                        k ← k + 1;
                return X_i;
```

The function randReduce in the above pseudocode is invoked on each set of collection opportunities $P_i$ for sub-region $r_i$. This function constructs a subset $X_i$ by randomly selecting opportunities from $P_i$. The output subset $X_i$ is constructed in $|P_i|=d$ rounds. The randomized selection based algorithm utilizes a Boolean array b of size d, with elements initialized to false before the rounds. In each round, the randomized selection based algorithm randomly selects one element of b, generate a random number, and decide whether to set the value of the element. This decision is based on whether the generated value is more than a threshold value. However, the threshold is dynamic, follows a decay function (shown in line 3 of above pseudocode) and gradually reduces as the round progresses. This is done with two-fold objective. First, to ensure that at least one collection opportunity for the region is included, and second if the list is large, more number of opportunities are rejected. The characteristic of the threshold is controlled by classical exponential decay function with decay rate λ. At the end of the d rounds, the elements of the Boolean array b contains random values. These d Boolean values are mapped with the elements of $P_i$ and the elements which are mapped to true value is included in $X_i$ (as shown in loop at line 8 of the above pseudocode). Essentially, the randReduce function randomly selects elements from $P_i$, but number of selections is controlled by the decay function.

In another embodiment, the randomized selection based algorithm is invoked for each of sub-regions, which is of complexity O(n). The randomized selection based algorithm takes as input a list of collection opportunities as $P_i$. The loop at line 2 of the pseudocode of the randomized selection based algorithm randomly generates choices for inclusion of an opportunity in the collection task schedule. Finally, the collection task schedule is constructed from the random choices in the loop at line 8 of the pseudocode of the randomized selection based algorithm. Both the loops, at line 2 and at line 8 of the pseudocode of the randomized selection based algorithm are executed $|P_i|=d$ times. Given, H as the scheduling horizon and f as mean frequency of rotation satellites around earth, a mean number of rotations within a scheduling period is Hf. Since a sub-region can be visible to a satellite at most once in every revolution, d is upper bounded by Hf. Therefore, complexity of step at line 6 of randomization based redundant collection task scheduling algorithm is O(nf=O(nH), where f is constant. Further, termination guarantee of the randomization based redundant collection task scheduling algorithm is straight-forward since all loops are well-bounded.

The steps 206 and 208 are better understood by way of the following description provided as exemplary explanation.

For Example, the set of collection opportunities be denoted as T⊆R×S×[0, H], where H is the scheduling horizon. Further, a scheduler function denoted as χ(S, R, H) is used to generate a set of tuples as a collection task schedule X={<$r_i$, $S_j$, t, $ρ_j$>}, where $r_i$∈R, $S_j$∈S, and t∈[0, H]. Here, X⊆T. Conventional scheduling algorithms generate the collection task schedule with optimization criterion like maximization of number of collections, turn-around time, and/or the like, while satisfying collection constraints associated with observations and satellites. The constraints include resolution of collected data, maximum zenith angle with the region, satellite kinematics constraints like slew capacity for collections, and/or the like. For an optimal scheduler, the tuple ($r_i$, $S_j$, t) is unique in X. The collection task scheduling problem of in this context is also computationally hard problem.

Conventional scheduling algorithms perform collection task assignments without any redundancy. The objective is to minimize data volume for collections and thereby minimize communication effort. This strategy works well when there are no occlusions to corrupt data. However, presence of occlusions, like cloud cover below satellites, renders collected data useless for analysis. With the present remote sensing processing pipeline, until the data is transferred to the ground station and analyzed, it cannot be decided whether the data is useful or not. In effect, whole sensing process chain, involving RoI tessellation, data collection, data transportation to the ground stations, and finally data analysis, are wasted. When observation data for most part of an RoI are occluded, no useful information can be gathered about it. As a result, observation task for the whole RoI fails and this implies that whole collective effort of data collection for all sub-regions are wasted. The present disclosure provides an algorithm to improve probability of success of observations on RoIs in presence of occlusions, and thereby improve system performance.

For example, model of the external sources of occlusions is denoted as O. The objective is to devise a strategy, say G, to mitigate error sources. It is assumed that the satellite has no mechanism to determine whether its sensing system is occluded or that the collected image is occluded. The objective of G is to enable execution of the schedule χ(S, R, H) such that the collection task or observations task for R is successfully completed. It is assumed that a collection task $t_i \in X$ is successful, if at least β-fraction of pixels of the collected image is free of occlusion. However, in the present disclosure, an analysis is presented based on whether an image as a whole is useful, and β parameter is not considered to determine useful-ness of the collected image. The collection task $t_i$ is successful if the collected image is useful. The strategy which ensures this notion of success as is denoted by G(α). Then, a collection schedule which is aware of such external sources and employs a strategy to mitigate it as a composition is provided which is denoted by χ(S, R, H)·O·G (α)=χ·(S, R, H, α). Here, O serves as an adversary to scheduling objectives, but in this case it acts as a passive adversary. When the adversary can be modelled accurately, the scheduler can devise an appropriate strategy to counter its actions. Redundancy is a generic strategy to counter failures. In this context, redundancy can be achieved by scheduling an observation sub-task at multiple time instances for possibly multiple satellites based on their trajectories and related constraints. Although, redundancy increases possibility of successful collection in presence of external occlusions, it produces higher data volume to communicate to the ground station. However, adversary like cloud cover over a region cannot be predicted accurately. Randomization is a generic strategy that handle such non-determinism. Randomization in this context implies randomly choosing a subset of collection opportunities from the set of collection opportunities T, such that a probability that one instance of data for a sub-region is useful increases, but resource wastage due to redundancy is reduced. So, this is a trade-off to balance success probability with collected data volume.

In an embodiment, the generated collection task schedule for each satellite in the satellite constellation for each region from the plurality of regions is used for mitigating occlusions.

In an embodiment, the probability of success of the randomization based redundant collection task scheduling algorithm of the present disclosure is based on spatial and temporal distribution of cloud cover. In an embodiment, an analysis of success of the probability of success of the randomization based redundant collection task scheduling algorithm of the present disclosure is described and better understood by way of the following description provided as exemplary explanation.

Model of cloud cover: There exist multiple conventional ways of statistical modelling of cloud in view of its significance in earth observation. Among several conventional models, a state of the art Burger model was independently verified to conform to observed cloud cover data collected by several organizations, including NASA. A Burger distribution B(C,r), is characterized by two variables namely crest or mean cloud amount $C \in 0, 1]$ at an observation point and span or scale distance r which is defined as a distance of separation between two observation points. When spatial scale is small, observer sees multiple cloud formations within its field of view and shape of the cloud amount distribution tends to be uni-modal with maxima at the mean amount. On the other hand, when this is large in comparison to the field of view, observer sees one of two large formations and the shape of cloud amount distribution is bi-modal with maxima close to zero and overcast.

Figure 3:
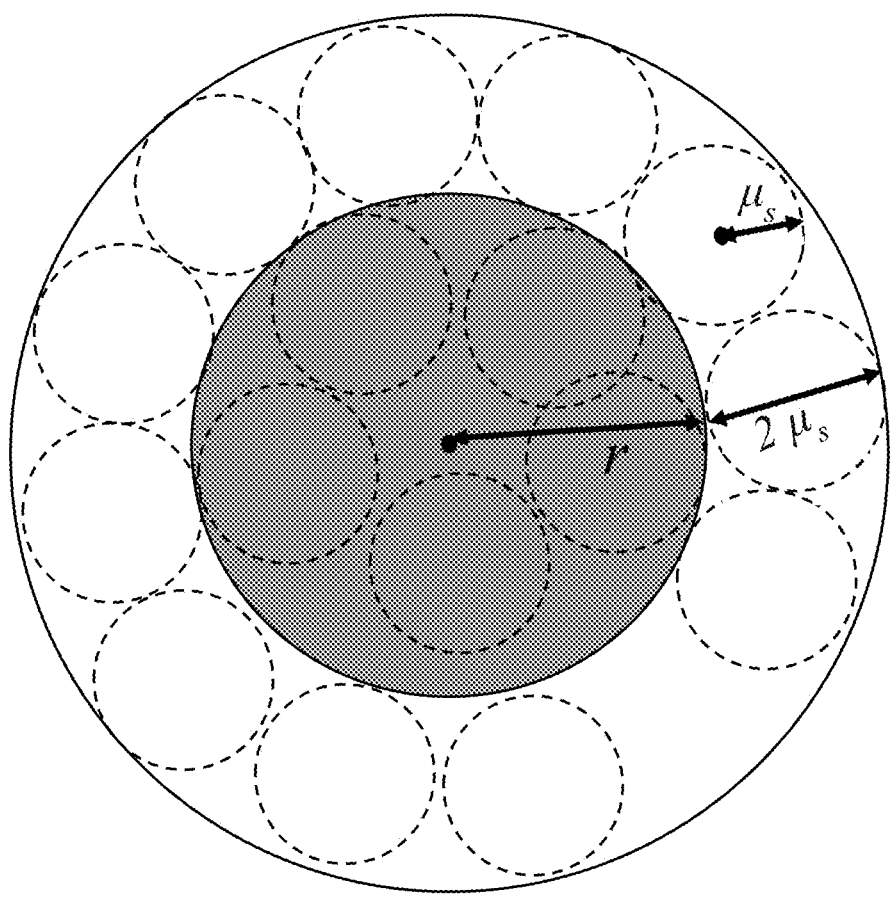
FIG. 3 depicts a schematic diagram of possible cloud coverings around region of interest (RoI) for randomization based redundant collection task scheduling for mitigating occlusions in sensing by small satellite constellations according to some embodiments of the present disclosure.

FIG. 3 depicts a schematic diagram of possible cloud coverings around region of interest (RoI) for randomization based redundant collection task scheduling for mitigating occlusions in sensing by small satellite constellations according to some embodiments of the present disclosure. As shown in FIG. 3, smaller circles with dotted outline represent cloud cover with center being the crest of the cloud cover. For a pessimistic estimation of the cloud cover in a region, a maximum number of cloud crest that can be accommodated around the RoI and having covering influence on the RoI is required to be counted. A region of influence, as depicted in the FIG. 3, represents such an area. Since the RoI is circular, the region of influence is also circular, concentric to RoI, with a radius of $r+2\mu_s=R$. Packing density of the covered area by such circles (i.e., cloud covers) is known to be upper bounded by $\pi/2\sqrt{3}$. So, the maximum number of cloud cover circles that can be packed within the region of influence is $(\pi R^2/\pi\mu_s^2) \times (\pi/2\sqrt{3}) = (R/\mu_s)^2(\pi/2\sqrt{3})$. Given a mean probability of presence of cloud crest to be $\mu_c$ in a region, an expected number of cloud crests present in the region of influence is $\mu_c \times (R/\mu_s)^2(\pi/2\sqrt{3})$. Therefore, the mean probability of the cloud cover at any point within the RoI, is provided in equation (1) below:

$$Pr(CC) = \frac{\pi r^2}{\pi R^2} \times \left( \mu_c \left(\frac{R}{\mu_s}\right)^2 \frac{\pi}{2\sqrt{3}} \right) = \frac{\pi \mu_c}{2\sqrt{3}} \left(\frac{r}{\mu_s}\right)^2 \qquad (1)$$

Since a RoI (R) is tessellated into n sub-regions (R={$r_1, r_2, \ldots r_n$}), it is assumed that tessellation divides the RoIs into equal divisions, thus area of each sub-regions is $a=\pi r^2/n$. Therefore, the probability of successful execution of collection task associated with a sub-region is, provided in equation (2) below as:

$$Pr(a_{succ}) = a \times (1 - Pr(CC)) = \frac{\pi r^2}{n} \left( 1 - \frac{\pi \mu_c}{2\sqrt{3}} \left(\frac{r}{\mu_s}\right)^2 \right) \qquad (2)$$

The scheduler models cloud covering adversaries as cloud crests to be independently and identically distributed, in both temporal and spatial dimension. According to this model, the probability of successful collection for a sub-region depends on distribution of the cloud crest and span of it, and not on the temporal or spatial variations. The scheduler presented in the present disclosure is based on this simplistic model and uses redundancy in collections to increase the probability of successful collection for a sub-region.

Model of the Scheduler: In the present disclosure, the scheduler chooses α fraction of the sub-regions, which has higher number of collection opportunities in comparison to the other sub-regions and selects random number of additional collections for each of them. For example, it is assumed that a sub-region is put into one of l buckets {$B_1, B_2, \ldots B_l$}, based on number of observations scheduled for it. Each bucket $B_i$ is a set of sub-regions, i.e., $B_i=\{r_{i,1}, \ldots r_{i,n_i}, n_i : r_{i,j} \in R\}$ such that each sub-region in $B_i$ has i collection task schedules. Therefore, $\forall i,j, i \neq j$: $B_i \cap B_j = \emptyset$ and $\cup B_i = R$. Further, it is considered that $|B_i|=n_i$. Success probability of observation of a sub-region $a \in B_i$ is provided in equation (3) below as:

$$i Pr(a_{succ}) = i \frac{\pi r^2}{n} \left( 1 - \frac{\pi \mu_c}{2\sqrt{3}} \left(\frac{r}{\mu_s}\right)^2 \right) = i\Omega, \qquad (3)$$

Here, term Ω is a probability value and provided in equation (4) below as:

$$\Omega = \frac{\pi r^2}{n}\left(1 - \frac{\pi \mu_c}{2\sqrt{3}}\left(\frac{r}{\mu_s}\right)^2\right) \qquad (4)$$

Thus, the probability of success for the region R is provided in equation (5) below as:

$$Pr(R_{succ}) = \Omega^{n_1} \times (2\Omega)^{n_2} \times (3\Omega)^{n_3} \ldots \times (l\Omega)^{n_l} \qquad (5)$$

Here, $\Sigma_{i=1}^{l} n_i = n$. The term $\Omega$ is in range [0, 1]. This function attains its maximum value when $n_l = n$.

In an embodiment, a scheduling algorithm descried in a state of the art computes a collection task schedule which maximizes total number of collections for sub-regions. This scheduling algorithm, which does not include any redundancy in the collection task schedule, places all sub-regions in a single bucket namely $B_1$. This scheduling algorithm is denoted as OPT, and has minimum overall success rate in presence of cloud. Further, another scheduling algorithm described in another state of the art is descried and denoted as MAX scheduling algorithm. The MAX scheduling algorithm includes all collection opportunities to maximize overall success probability, but at a cost of maximum collections per sub-region and therefore maximum data volume. As a middle path, heuristic randomization based redundant collection task scheduling algorithm of the present disclosure randomly chooses a sub-set of the opportunities, and denoted as RAND. However, maximum values of $n_i$'s are determined by number of collection opportunities for the sub-regions. For example, a sub-region with a number of collection opportunities cannot be placed in any bucket $B_q$ where q>a. Therefore, it can maximally contribute $a\Omega$ to $Pr(a_{succ})$ when all of its collection opportunities are included in the collection task schedule.

However, the RAND scheduling algorithm schedules only a subset of the collection opportunities. To analyze it, without loss of generality, two situations are assumed. In one situation, sub-region is moved from $B_a$ to $B_b$, and in another to $B_c$, where b>c. In the first movement, change in overall probability value is $\Delta_{ab} = C(a-b)\Omega$, where $C = \Omega^{n_1} \times (2\Omega)^{n_2} \ldots (a\Omega)^{n_a-1} \ldots \times (l\Omega)^{n_l}$. In second movement, the change in probability value is $\Delta_{ac} = C(a-c)\Omega$. Therefore, loss in the second situation is $\Delta_{ab} - \Delta_{ac} = -C\Omega(b-c)$. So, there is a linear loss of probability with the linear loss in number of collects. However, as $C\Omega < 1$, rate of loss in overall probability is much less than that for number of collections. The heuristic randomization based redundant collection task scheduling algorithm of the present disclosure reduces the redundant collection by a damping function, with little sacrifice in success probability as implied by fact that the rate of loss is slow.

EXPERIMENTAL RESULTS

In the present disclosure, experimental setup involves a simulation system, in which the dynamics of the satellites and cloud formations were simulated to test collection performance of different scheduling strategies. The plurality of track data for the satellites is generated by SkyField libraries using Two Line Element (TLE) description of satellites. In the present disclosure, TLEs published by PlanetLabs is used that describes the plurality of track data of satellites and their constellations and also a set of synthetically generated track data. The cloud formations were simulated with cloud data from National Oceanic and Atmospheric Administration (NOAA), USA and Climatic Research Unit (CRU) of Un. of East Anglia, UK. The collection schedules for a subset of satellites are generated offline using one of the three scheduling algorithms including conventional scheduling algorithms such as optimization (OPT), MAX and the randomization based redundant collection task scheduling algorithm of the present disclosure (Herein referred as RAND throughout the description), and then they are executed in the simulation system along with cloud formations to determine occlusions over collection regions. Two databases are used in the present disclosure and both the databases provide temporal variations of cloud formations and the simulation system caters for this variation while performing collection tasks as determined by the scheduling algorithms. The experiments were conducted for five different arrangements of RoIs that includes (a) Two defined large regions, (b) Two small defined regions, (c) Five small regions, (d) Random city locations drawn from world city database, and (e) Random areas on earth.

Figure 4:
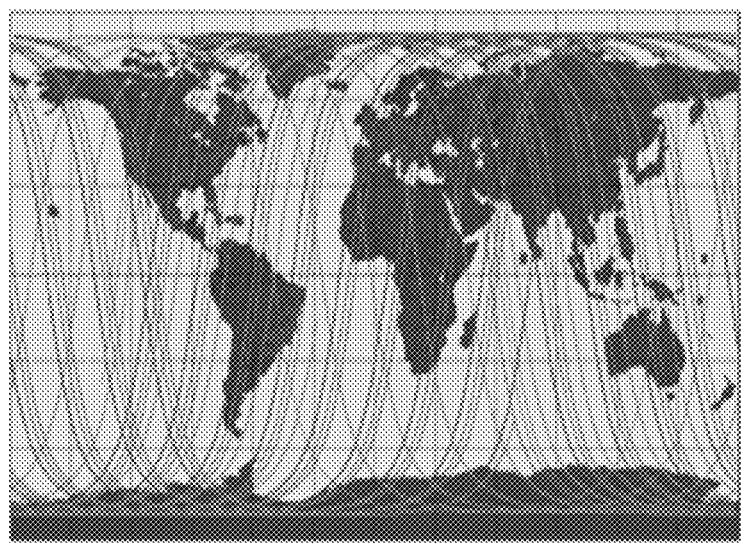
FIG. 4 shows a screenshot from simulation tool of the present disclosure depicting region of interest (RoIs) on random city locations, along with ground tracks of four PlanetLab satellites according to some embodiments of the present disclosure.

FIG. 4 shows a screenshot from simulation tool of the present disclosure depicting region of interest (RoIs) on random city locations, along with ground tracks of four PlanetLab satellites according to some embodiments of the present disclosure. It is known that each of the scheduling algorithms namely OPT, MAX and RAND, essentially chooses an appropriate sub-set of the collection opportunities for each sub-region from the plurality of sub-regions. This set of collection opportunities depends on the plurality of track data of each satellite in the satellite constellation, positions of the RoIs, and kinematics of each satellite in the satellite constellation. A state of the art method is implemented in the present disclosure to generate this set of collection opportunities and then the scheduling algorithms are applied on this set of collection opportunities. A comparative study of performance of these three scheduling algorithms is presented. Experiments were conducted with 0.85, 0.9, 0.95, and 1.0 values for $\alpha$. Each experiment was performed 15 times and average values were reported. The present disclosure refers to collection intensity, schedule intensity, and success intensity as average number of collection opportunities, average number of collection schedules, and average number of successful data collection per sub-region, respectively.

Figure 5A:
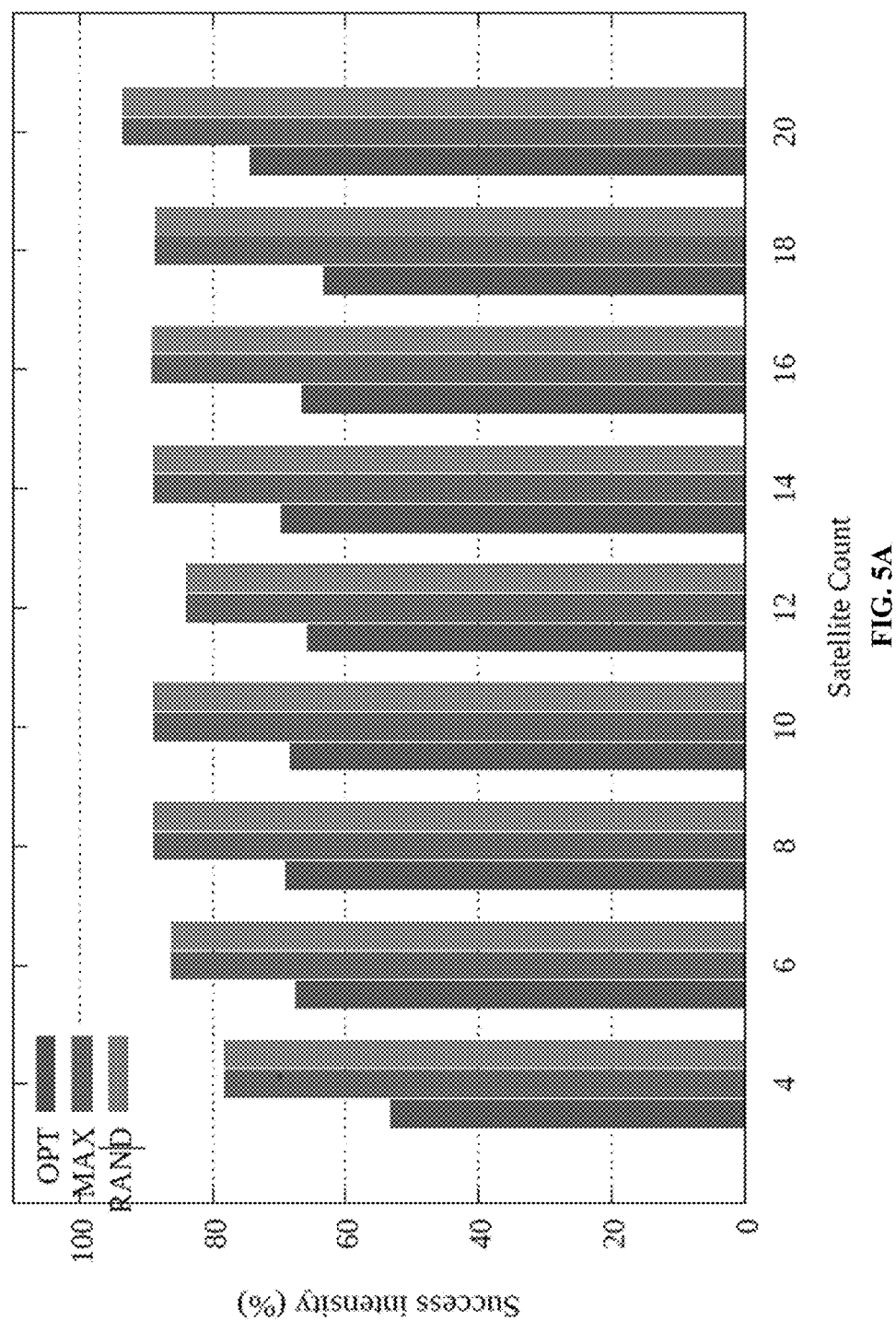
FIGS. 5A through 5C depict graphical representations providing a comparison of data collection performance of the method of present disclosure with conventional methods for sub-regions according to some embodiments of the present disclosure.
Figure 5B:
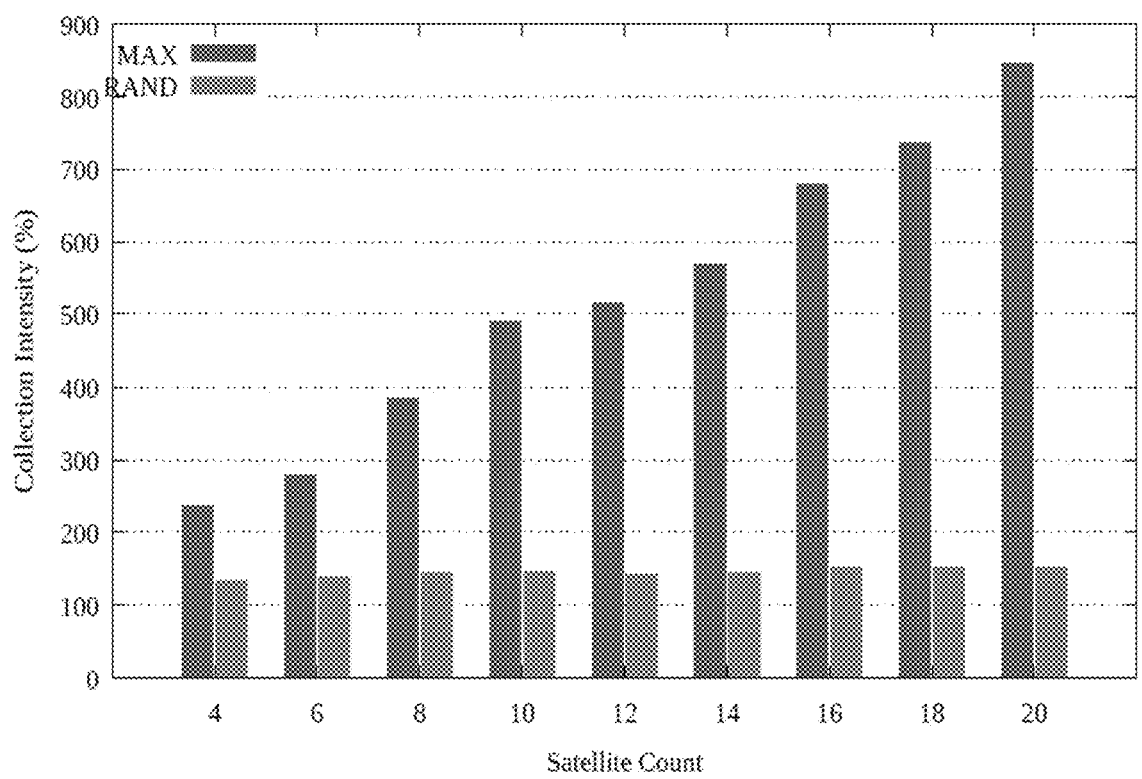
Figure 5C:
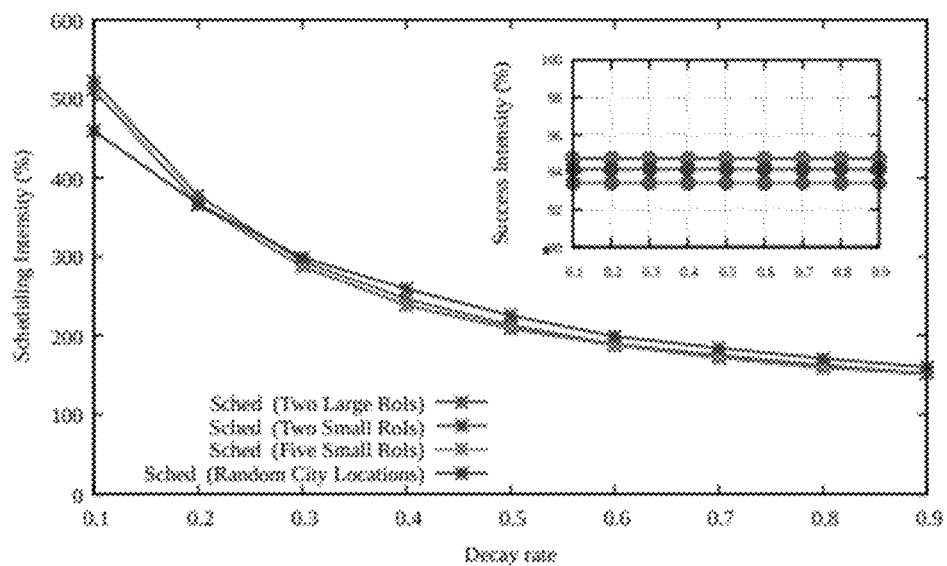

FIGS. 5A through 5C depict graphical representations providing a comparison of data collection performance of the method of present disclosure with conventional methods for sub-regions according to some embodiments of the present disclosure.

FIG. 5A depict a graphical representation providing a performance comparison of the method of present disclosure with conventional methods in terms of successful collections using different number of satellites of Planet Lab constellation, in presence of cloud cover according to some embodiments of the present disclosure. As shown in FIG. 5A, the collections are done for two well-defined large regions, which were tessellated and distributed for collection among the set of satellites in the satellite constellation. As observed from the graph shown in FIG. 5A, the OPT method has lowest success rate, since every sub-region is scheduled at most once for collection and no redundancy to counter possible cloud cover. In the other extreme, the MAX method includes every possible collection opportunity in the collection schedule, maximizing success probability for a sub-region and therefore has highest collection percentage among the three scheduling algorithms. The RAND method, on the other hand, demonstrates collection performance very close to that of MAX.

FIG. 5B depict a graphical representation providing a comparison of average collections made by the conventional scheduling algorithm (MAX) and the method of present disclosure (RAND) in terms of degree of redundancy according to some embodiments of the present disclosure. It is shown in FIG. 5B that average number of scheduled collection instances per sub-region for RAND is much lower than that of MAX. FIG. 5B essentially compares the degree of redundancy, therefore only MAX and RAND strategies are included and OPT is omitted since that does not allow any redundancy. FIG. 5B shows that number of redundant collections grows as number of satellite increases, because as the number of satellite increases, revisit frequency for a sub-region also increases. This results in more number of collection opportunities per sub-region. This explains growth of the collection intensity for the MAX scheduling algorithm which utilizes all collection opportunities. Although the RAND strategy randomly chooses a subset of available collection opportunities, but the decay function controlling the threshold for choice (as shown in line 3-6 in the randomized selection based algorithm), limits number of scheduled instances. Therefore, growth of the collection intensity for RAND is checked. RAND performs a smaller number of collections per sub-regions and selects them randomly from the set of available opportunities and this randomness quite effectively mitigates adversary. As a result, the success intensity is comparable with that of MAX.

FIG. 5C depict graphical representation illustrating trend of collection intensity with increase in the decay-rate of the decay function controlling the threshold associated with the randomized selection based algorithm according to some embodiments of the present disclosure.

The inset graph of FIG. 5C depicts variation of the success intensities with increase in the decay rate for various types of RoIs used in experiment of the present disclosure. It is observed from FIG. 5C that number of redundant collections decreases and naturally the success rate also decreases. However, the drop in the success rate is much slower in comparison to the drop in the number of redundant collections. This implies that one can choose a higher A value to reduce number of redundant collections significantly without much sacrifice in the success intensity. Although it is imperative that to improve successful collection by a small amount, high amount of redundant collection is necessary, but the gain in increasing the number of collections may not worth the data volume it generates. So, it is good to perform some redundant collections, but not too many which means it is good to keep A value high.

Figure 6:
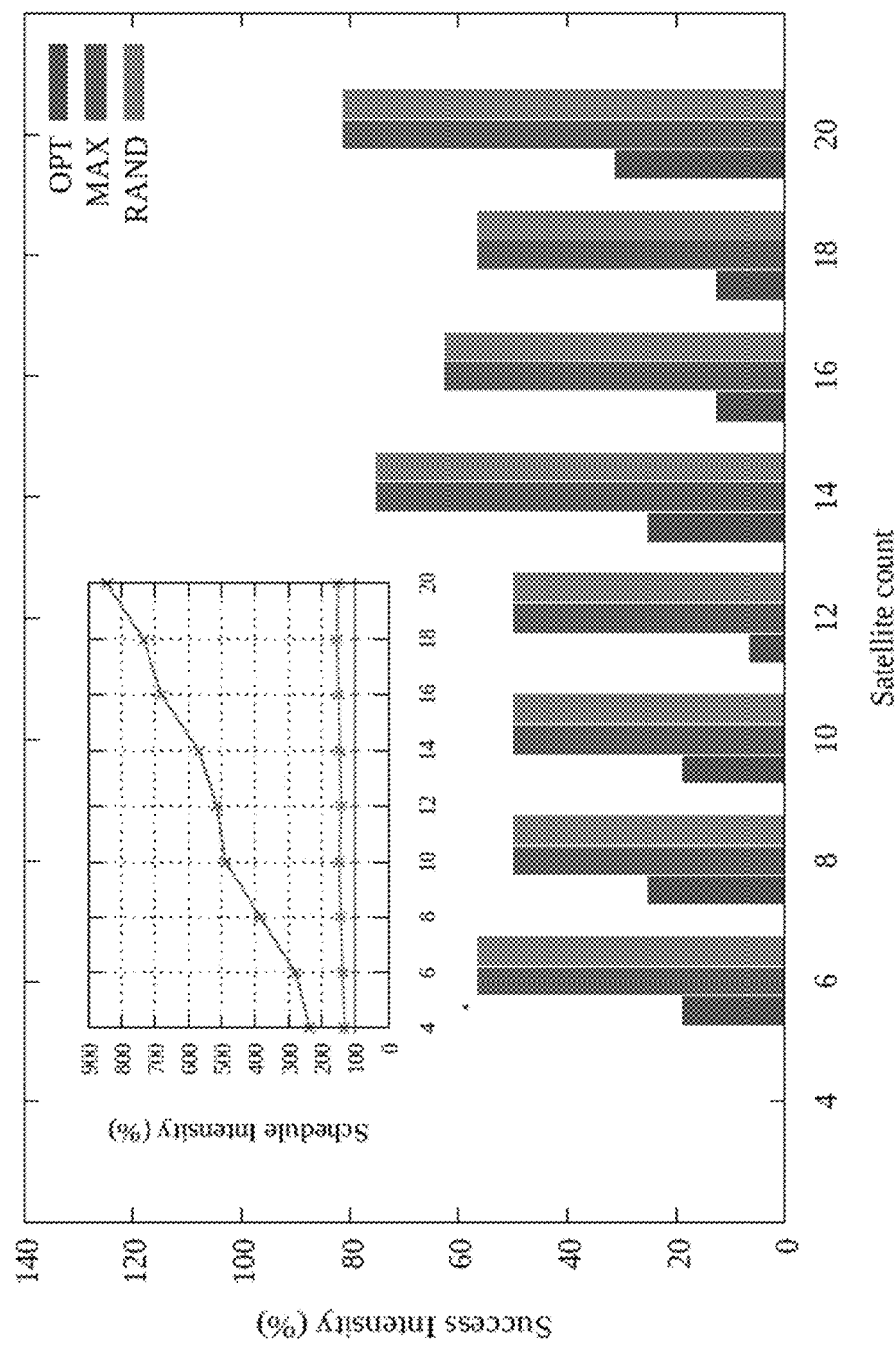
FIG. 6 depicts a graphical representation providing a performance comparison of the method of present disclosure with conventional methods in terms of the success intensity for whole RoIs according to some embodiments of the present disclosure.

In the present disclosure, since the objective is to collect useful observation data for RoIs, performance comparison of successful collection for whole RoIs is also presented. FIG. 6 depicts a graphical representation providing a performance comparison of the method of present disclosure with conventional methods in terms of the success intensity for whole RoIs according to some embodiments of the present disclosure. Comparative result depicted in FIG. 6 shows equivalent performance of MAX and RAND scheduling algorithms, while success of the OPT scheduling algorithm is less in all the collection experiments with different number of satellites. The inset graph of FIG. 4 shows variation schedule intensities for different number of satellites, corresponding to the main graph. This shows that although the success intensity of the method of the present disclosure (RAND) is at par with MAX scheduling algorithm, but schedule intensity is close to that of OPT, which implies that a higher success rate is possible with little investment in redundancy.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

Embodiments of the present disclosure provide an analytical study of performance of a collection task scheduler for a satellite constellation, in presence of external error sources like occlusion due to cloud cover. The external error sources act as adversaries for the scheduling performance. The error source is modelled as uniformly distributed in space and time and a randomization based redundant scheduling algorithm is provided to counter such error source. The present disclosure presents some simulation results which shows that the randomization based redundant scheduling algorithm is able to mitigate adversarial effect of cloud cover for optical data collection tasks for a constellation, at a cost of additional collection effort, which increases communication volume implying higher energy demands. The randomization based redundant scheduling algorithm of the present disclosure attempts to minimize number of additional collections through exploitation of the error source model. It is observed that a more esoteric model for error source would enable a more effective design of the collection task scheduler to reduce the number of redundant collections.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
   receiving, via one or more hardware processors, a request from a user, wherein the request is associated with generating a collection task schedule for a set of small satellites grouped as a satellite constellation for a plurality of regions of observations, and wherein the request comprises a scheduling horizon indicative of a time duration for which the collection task schedule is generated;
   tessellating, via the one or more hardware processors, each region of observation from the plurality of region of observations into a plurality of sub-regions based on a sensing capability of the satellite constellation;
   generating, via the one or more hardware processors, a plurality of track data for the satellite constellation for a predefined interval range of the scheduling horizon, wherein the plurality of track data represents position of a corresponding satellite from the satellite constellation over earth for a period of the predefined interval range of the scheduling horizon;
   computing, via the one or more hardware processors, a set of collection opportunities by each satellite in the satellite constellation for each sub-region from the plurality of sub-regions based on the plurality of track data for the satellite constellation; and
   generating, via the one or more hardware processors, the collection task schedule for each satellite in the satellite constellation for each region from the plurality of regions using a randomized selection based algorithm, wherein the randomized selection based algorithm comprises:
      creating a Boolean array of a predefined size with each element of the Boolean array initialized as false;
      iteratively performing for the predefined size of the Boolean array, steps of:
         randomly selecting an element of the Boolean array;
         generating a random number within a predefined range;
         setting value of the randomly selected element of the Boolean array to true when the generated random number is more than a threshold; and
         creating, by including the randomly selected element of the Boolean array set as true, a subset of collection opportunities from the set of collection opportunities by each satellite in the satellite constellation for each sub-region; and
      generating the collection task schedule for each satellite in the satellite constellation for each sub-region from the plurality of sub-regions, using the subset of collection opportunities.

2. The processor implemented method as claimed in claim 1, wherein the generated collection task schedule for each satellite in the satellite constellation for each region from the plurality of regions is used for mitigating occlusions.

3. The processor implemented method as claimed in claim 1, wherein the set of collection opportunities is redundant, where each redundant collection opportunity represents a probability of successful collection by each satellite in the satellite constellation for each sub-region from the plurality of sub-regions.

4. The processor implemented method as claimed in claim 1, wherein the predefined size of the Boolean array is equal to number of collection opportunities in the computed set of collection opportunities.

5. The processor implemented method as claimed in claim 1, wherein the threshold is controlled by a decay function to control the number of collection opportunities to be selected from the set of collection opportunities.

6. The processor implemented method as claimed in claim 1, wherein the threshold is dynamically updated.

7. The processor implemented method as claimed in claim 1, wherein the decay function is an exponential decay function with decay rate A.

8. A system, comprising:
   a memory storing instructions;
   one or more communication interfaces; and
   one or more hardware processors coupled to the memory via the one or more communication interfaces, wherein the one or more hardware processors are configured by the instructions to:
      receive a request from a user, wherein the request is associated with generating a collection task schedule for a set of small satellites grouped as a satellite constellation for a plurality of regions of observations, and wherein the request comprises a scheduling horizon indicative of a time duration for which the collection task schedule is generated;
      tessellate each region of observation from the plurality of region of observations into a plurality of sub-regions based on a sensing capability of the satellite constellation;
      generate a plurality of track data for the satellite constellation for a predefined interval range of the scheduling horizon, wherein the plurality of track data represents position of a corresponding satellite from the satellite constellation over earth for a period of the predefined interval range of the scheduling horizon;

compute a set of collection opportunities by each satellite in the satellite constellation for each sub-region from the plurality of sub-regions based on the plurality of track data for the satellite constellation; and generate the collection task schedule for each satellite in the satellite constellation for each region from the plurality of regions using a randomized selection based algorithm, wherein the randomized selection based algorithm comprises:

creating a Boolean array of a predefined size with each element of the Boolean array initialized as false;

iteratively performing for the predefined size of the Boolean array, steps of:

randomly selecting an element of the Boolean array;

generating a random number within a predefined range;

setting value of the randomly selected element of the Boolean array to true when the generated random number is more than a threshold; and creating, by including the randomly selected element of the Boolean array set as true, a subset of collection opportunities from the set of collection opportunities by each satellite in the satellite constellation for each sub-region; and generating the collection task schedule for each satellite in the satellite constellation for each sub-region from the plurality of sub-regions, using the subset of collection opportunities.

9. The system as claimed in claim 8, wherein the generated collection task schedule for each satellite in the satellite constellation for each region from the plurality of regions is used for mitigating occlusions.

10. The system as claimed in claim 8, wherein the set of collection opportunities is redundant, where each redundant collection opportunity represents a probability of successful collection by each satellite in the satellite constellation for each sub-region from the plurality of sub-regions.

11. The system as claimed in claim 8, wherein the predefined size of the Boolean array is equal to number of collection opportunities in the computed set of collection opportunities.

12. The system as claimed in claim 8, wherein the threshold is controlled by a decay function to control the number of collection opportunities to be selected from the set of collection opportunities.

13. The system as claimed in claim 8, wherein the threshold is dynamically updated.

14. The system as claimed in claim 8, wherein the decay function is an exponential decay function with decay rate A.

15. One or more non-transitory computer readable mediums comprising one or more instructions which when executed by one or more hardware processors cause:

receiving a request from a user, wherein the request is associated with generating a collection task schedule for a set of small satellites grouped as a satellite constellation for a plurality of regions of observations, and wherein the request comprises a scheduling horizon indicative of a time duration for which the collection task schedule is generated;

tessellating each region of observation from the plurality of region of observations into a plurality of sub-regions based on a sensing capability of the satellite constellation;

generating a plurality of track data for the satellite constellation for a predefined interval range of the scheduling horizon, wherein the plurality of track data represents position of a corresponding satellite from the satellite constellation over earth for a period of the predefined interval range of the scheduling horizon;

computing a set of collection opportunities by each satellite in the satellite constellation for each sub-region from the plurality of sub-regions based on the plurality of track data for the satellite constellation; and generating the collection task schedule for each satellite in the satellite constellation for each region from the plurality of regions using a randomized selection based algorithm, wherein the randomized selection based algorithm comprises:

creating a Boolean array of a predefined size with each element of the Boolean array initialized as false;

iteratively performing for the predefined size of the Boolean array, steps of:

randomly selecting an element of the Boolean array;

generating a random number within a predefined range;

setting value of the randomly selected element of the Boolean array to true when the generated random number is more than a threshold; and creating, by including the randomly selected element of the Boolean array set as true, a subset of collection opportunities from the set of collection opportunities by each satellite in the satellite constellation for each sub-region; and generating the collection task schedule for each satellite in the satellite constellation for each sub-region from the plurality of sub-regions, using the subset of collection opportunities.

* * * * *